United States Patent
Toizumi et al.

(10) Patent No.: US 11,334,772 B2
(45) Date of Patent: May 17, 2022

(54) IMAGE RECOGNITION SYSTEM, METHOD, AND PROGRAM, AND PARAMETER-TRAINING SYSTEM, METHOD, AND PROGRAM

(71) Applicant: NEC CORPORATION, Tokyo (JP)

(72) Inventors: Takahiro Toizumi, Tokyo (JP); Yuzo Senda, Tokyo (JP)

(73) Assignee: NEC CORPORATION, Tokyo (JP)

(*) Notice: Subject to any disclaimer, the term of this patent is extended or adjusted under 35 U.S.C. 154(b) by 37 days.

(21) Appl. No.: 16/955,605

(22) PCT Filed: Dec. 22, 2017

(86) PCT No.: PCT/JP2017/046162
§ 371 (c)(1),
(2) Date: Jun. 18, 2020

(87) PCT Pub. No.: WO2019/123642
PCT Pub. Date: Jun. 27, 2019

(65) Prior Publication Data
US 2021/0056343 A1   Feb. 25, 2021

(51) Int. Cl.
*G06K 9/62* (2022.01)
*G06V 10/44* (2022.01)

(52) U.S. Cl.
CPC ........... *G06K 9/627* (2013.01); *G06K 9/6247* (2013.01); *G06K 9/6256* (2013.01); *G06V 10/443* (2022.01)

(58) Field of Classification Search
None
See application file for complete search history.

(56) References Cited

U.S. PATENT DOCUMENTS

| 2014/0376804 A1* | 12/2014 | Akata | G06K 9/628 |
| | | | 382/159 |
| 2015/0278580 A1* | 10/2015 | Sato | G06K 9/00268 |
| | | | 382/118 |

FOREIGN PATENT DOCUMENTS

| JP | 2010-039778 A | 2/2010 |
| JP | 2015-185034 A | 10/2015 |
| JP | 2016-071684 A | 5/2016 |

OTHER PUBLICATIONS

Hugo Larochelle, et al., "Zero-data Learning of New Tasks", Proceedings of the Twenty-Third AAAI Conference on Artificial Intelligence, 2008, pp. 646-651.

(Continued)

*Primary Examiner* — Leon Flores (57) ABSTRACT

A label feature extraction means 71 extracts, from reference information, a label feature that is a vector representing a feature of the reference information. A label feature dimension reduction means 72 performs dimension reduction of the label feature. An image feature extraction means 73 extracts an image feature from a target image that is an image in which an object to be recognized is captured. A feature transformation means 74 performs feature transformation on the image feature in such a manner that comparison with the label feature after the dimension reduction becomes possible. The class recognition means 75 recognizes a class of the object to be recognized by comparing the image feature after the feature transformation with the label feature after the dimension reduction.

7 Claims, 8 Drawing Sheets

(56) References Cited

OTHER PUBLICATIONS

Andrea Frome, et al., "DeViSE: A Deep Visual-Semantic Embedding Model" In NIPS, 2013, pp. 1-11.
International Search Report for PCT/JP2017/046162 dated Mar. 20, 2018 [PCT/ISA/210].
Written Opinion for PCT/JP2017/046162 dated Mar. 20, 2018 [PCT/ISA/237].

* cited by examiner

IMAGE RECOGNITION SYSTEM, METHOD, AND PROGRAM, AND PARAMETER-TRAINING SYSTEM, METHOD, AND PROGRAM

CROSS REFERENCE TO RELATED APPLICATIONS

This application is a National Stage of International Application No. PCT/JP2017/046162 filed Dec. 22, 2017.

TECHNICAL FIELD

The present invention relates to an image recognition system, image recognition method, and image recognition program for recognizing an unknown image, and a parameter-training system, parameter-training method, and parameter-training program for training a parameter used in processing of recognizing an unknown image.

BACKGROUND ART

Recognizing an unknown image is called zero-shot recognition. Then, one of problem settings for image recognition is the zero-shot recognition. The zero-shot recognition is introduced in NPL 1. In the zero-shot recognition, labels of training data and test data are separated, and unsupervised recognition is performed with respect to the test data. In the zero-shot recognition, a label feature is used in addition to an image feature. In a training phase, linear mapping between the image feature and the label feature is trained. In a test phase, an image feature of the test data is transformed into a label feature by utilization of the trained linear mapping, and recognition is performed in a space of the label feature.

Also, an example of a zero-shot recognition system is described in NPL 2.

Also, a method of reducing a dimension of a feature space is described in PTL 1.

CITATION LIST

Patent Literature

PTL 1: Japanese Patent Application Laid-Open No. 2010-039778

Non Patent Literature

NPL 1: H. Larochelle, D. Erhan, and Y. Bengio, "Zero-Data Learning of New Tasks", Proceedings of the Twenty-Third AAAI Conference on Artificial Intelligence, 2008.
NPL 2: A. Frome, G S. Corrado, J. Shlens, S. Bengio, J. Dean, M. A. Ranzato, and T. Mikolov, "DeViSE: A Deep Visual-Semantic Embedding Model", In NIPS, 2013.

SUMMARY OF INVENTION

Technical Problem

In general zero-shot recognition, there is a problem that estimation accuracy of a label feature is deteriorated. The reason is that information unnecessary for recognition of an image feature is included in the label feature during a feature transformation from the image feature to the label feature and a value of each dimension of a feature vector varies due to this unnecessary information. Then, a distance function for recognition varies. As a result, recognition accuracy (recognition accuracy) for test data is deteriorated.

Also, when the number of dimensions of the label feature and the image feature is large, over-fitting occurs in a case where an amount of data is small. As a result, recognition accuracy (recognition accuracy) for test data is deteriorated.

Thus, the present invention is to provide an image recognition system, an image recognition method, and an image recognition program capable of accurately recognizing an object to be recognized.

Also, the present invention is to provide a parameter-training system, a parameter-training method, and a parameter-training program capable of training a parameter, which is used in processing of recognition an object to be recognized, in such a manner that the object to be recognized can be accurately recognized.

Solution to Problem

An image recognition system according to the present invention includes: a label feature extraction means that extracts, from reference information, a label feature that is a vector representing a feature of the reference information; a label feature dimension reduction means that performs dimension reduction of the label feature; an image feature extraction means that extracts an image feature from a target image that is an image in which an object to be recognized is captured; a feature transformation means that performs a feature transformation on the image feature in such a manner that comparison with the label feature after the dimension reduction becomes possible; and a class recognition means that recognizes a class of the object to be recognized by comparing the image feature after the feature transformation with the label feature after the dimension reduction.

Also, a parameter-training system according to the present invention includes: a label feature extraction means that extracts, from reference information, a label feature that is a vector representing a feature of the reference information; a label feature dimension reduction means that performs dimension reduction of the label feature; an image feature extraction means that extracts an image feature from a target image that is an image in which an object to be recognized is captured; and a parameter-training means that trains a parameter, which is used for a transformation of the image feature, on the basis of the label feature after the dimension reduction and the image feature.

Also, an image recognition method according to the present invention includes: extracting, from reference information, a label feature that is a vector representing a feature of the reference information; performing dimension reduction of the label feature; extracting an image feature from a target image that is an image in which an object to be recognized is captured; performing a feature transformation on the image feature in such a manner that comparison with the label feature after the dimension reduction becomes possible, and recognizing a class of the object to be recognized by comparing the image feature after the feature transformation with the label feature after the dimension reduction.

Also, a parameter-training method according to the present invention includes: extracting, from reference information, a label feature that is a vector representing a feature of the reference information; performing dimension reduction of the label feature; extracting an image feature from a target image that is an image in which an object to be recognized is captured; and training a parameter, which is used for a transformation of the image feature, on the basis of the label feature after the dimension reduction and the image feature.

Also, an image recognition program according to the present invention causes a computer to execute label feature extraction processing of extracting, from reference information, a label feature that is a vector representing a feature of the reference information, label feature dimension reduction processing of performing dimension reduction of the label feature, image feature extraction processing of extracting an image feature from a target image that is an image in which an object to be recognized is captured, feature transformation processing of performing a feature transformation on the image feature in such a manner that comparison with the label feature after the dimension reduction becomes possible, and class recognition processing of recognizing a class of the object to be recognized by comparing the image feature after the feature transformation with the label feature after the dimension reduction.

Also, a parameter-training program according to the present invention causes a computer to execute label feature extraction processing of extracting, from reference information, a label feature that is a vector representing a feature of the reference information, label feature dimension reduction processing of performing dimension reduction of the label feature, image feature extraction processing of extracting an image feature from a target image that is an image in which an object to be recognized is captured, and parameter-training processing of training a parameter, which is used for a transformation of the image feature, on the basis of the label feature after the dimension reduction and the image feature.

Advantageous Effects of Invention

According to the present invention, an object to be recognized can be recognized accurately.

Also, according to the present invention, it is possible to train a parameter, which is used in processing of recognizing an object to be recognized, in such a manner that the object to be recognized can be recognized accurately.

DESCRIPTION OF EMBODIMENTS

In the following, exemplary embodiments of the present invention will be described with reference to the drawings.

First Exemplary Embodiment

Figure 1:
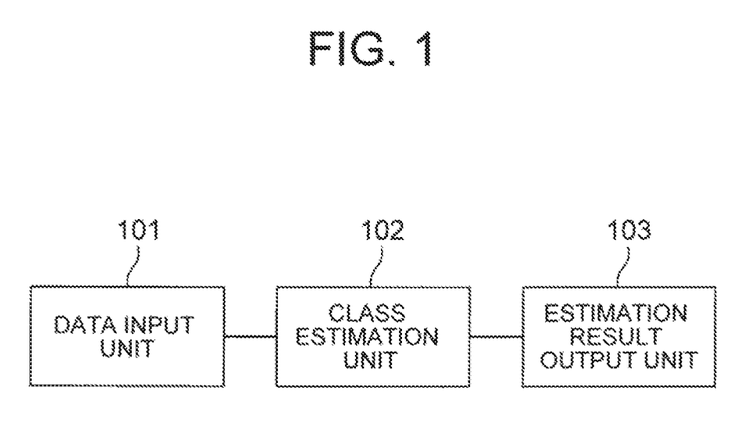
FIG. 1 It depicts a block diagram illustrating a configuration example of an image recognition system of the present invention.

FIG. 1 is a block diagram illustrating a configuration example of an image recognition system of the present invention. The image recognition system of the present invention includes a data input unit 101 to which image data or the like is input, a class estimation unit 102 that estimates a class to which the image data belongs, and an estimation result output unit 103 that outputs an estimation result. Note that it can be said that estimating (recognizing) a class of image data means estimating (recognizing) a class of an object that is captured in the image data and that is to be recognized.

Figure 2:
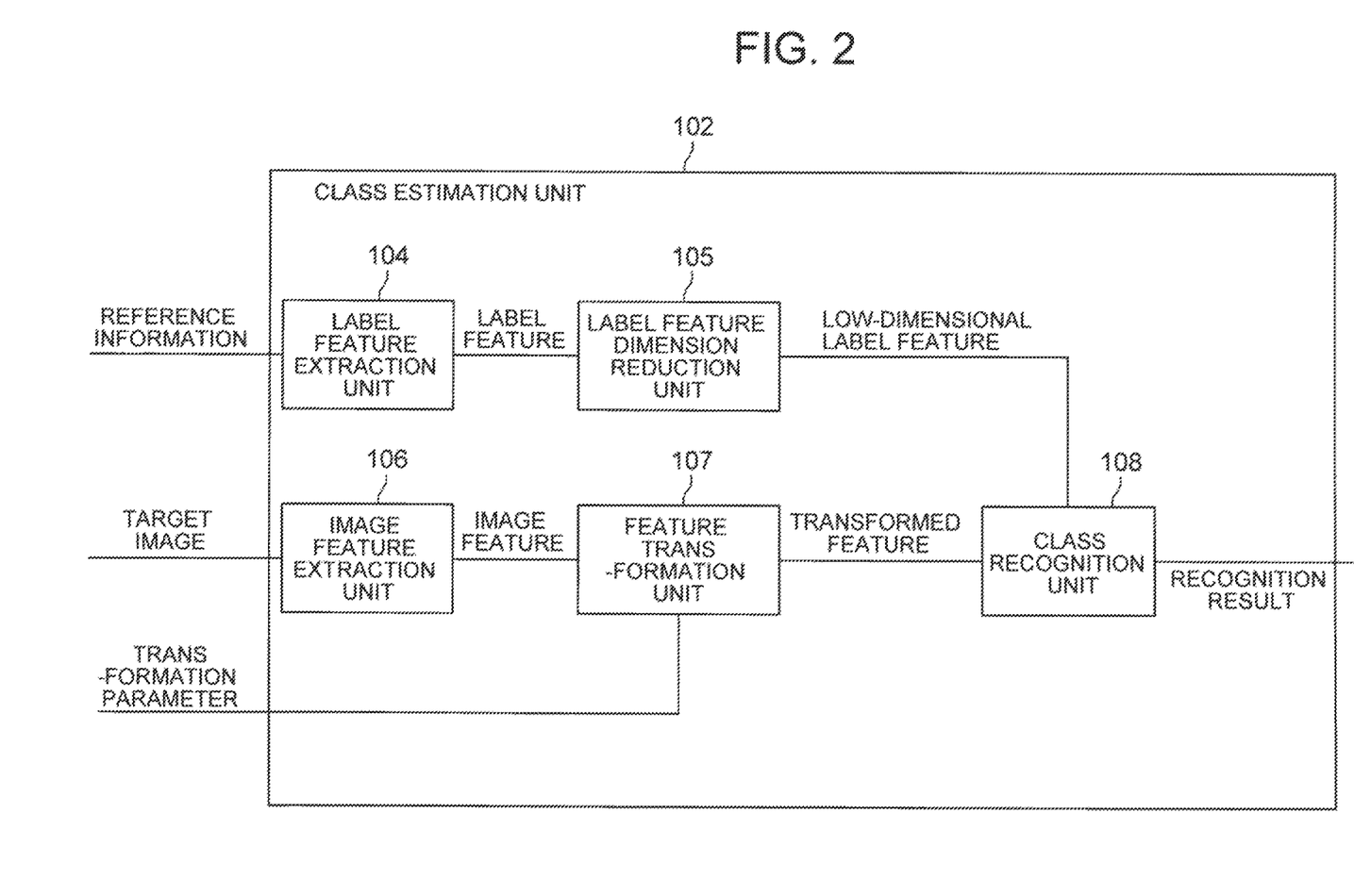
FIG. 2 It depicts a block diagram illustrating a configuration example of a class estimation unit.

FIG. 2 is a block diagram illustrating a configuration example of the class estimation unit 102. The class estimation unit 102 includes a label feature extraction unit 104, a label feature dimension reduction unit 105, an image feature extraction unit 106, a feature transformation unit 107, and a class recognition unit 108.

The label feature extraction unit 104 extracts, from reference information, a label feature that is a vector representing a feature of the reference information.

The label feature dimension reduction unit 105 performs dimension reduction of the label feature.

The image feature extraction unit 106 extracts an image feature from a target image. The target image is an image in which an object to be recognized is captured.

The feature transformation unit 107 performs a feature transformation on the image feature in such a manner that comparison with the label feature after the dimension reduction becomes possible.

The class recognition unit 108 recognizes a class of the object to be recognized by comparing the image feature after the feature transformation with the label feature after the dimension reduction.

Figure 3:
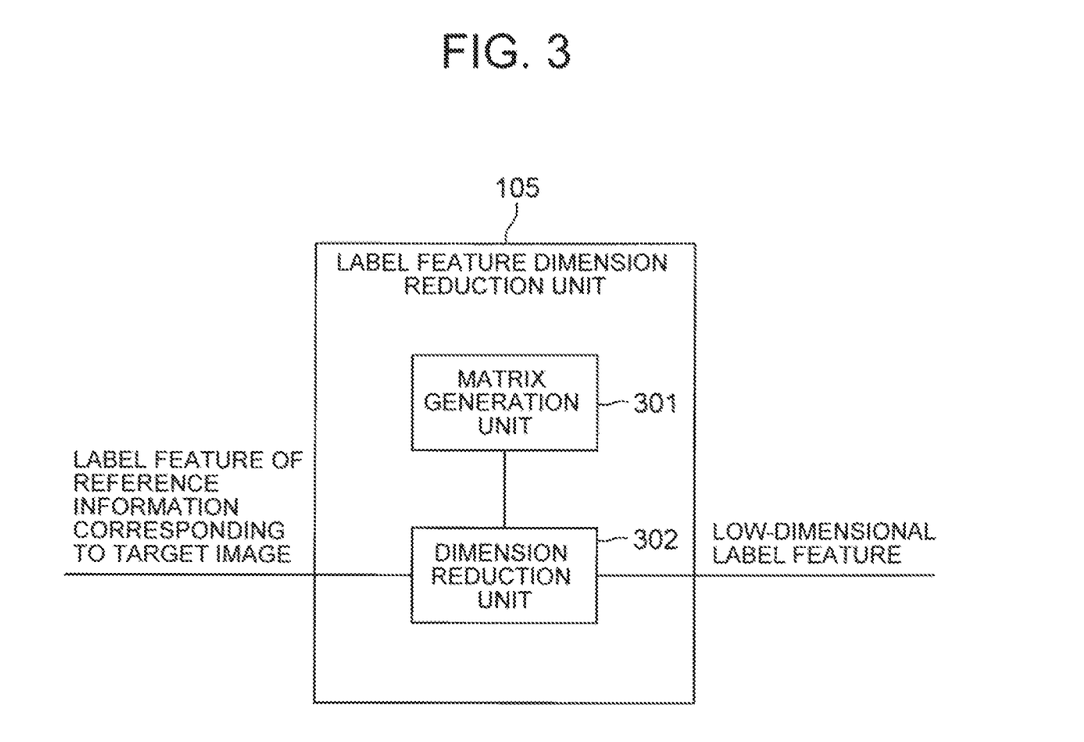
FIG. 3 It depicts a block diagram illustrating a configuration example of a label feature dimension reduction unit.

FIG. 3 is a block diagram illustrating a configuration example of the label feature dimension reduction unit 105. The label feature dimension reduction unit 105 includes a matrix generation unit 301 and a dimension reduction unit 302.

The matrix generation unit 301 generates a transformation matrix.

The dimension reduction unit 302 performs dimension reduction of a label feature of reference information corresponding to a target image by using the transformation matrix.

The data input unit 101 is a data input interface to which data such as a target image is input. A target image, a parameter used in the class estimation unit 102, and reference information for recognition of an unknown image are input to the data input unit 101. As the target image, an image in which an object to be recognized is captured is input. The object to be recognized is different from an object that is to be recognized and is trained in advance for recognition in the class estimation unit 102.

For example, label data such as a name is used as the reference information. However, the reference information is not limited to such label data. For example, in a case where a target image is an image such as an image acquired by a synthetic aperture radar and is different from a general optical image, reference information may be an optical image corresponding to the image. In the following, an image acquired by the synthetic aperture radar is referred to as a synthetic aperture radar (SAR) image. In a case where reference information is an optical image, there is a case where the reference information is referred to as a reference image.

On the basis of a target image, a parameter, and reference information input via the data input unit 101, the class estimation unit 102 estimates a class of a target image.

Each element included in the class estimation unit 102 (see FIG. 2) will be described in more detail.

The label feature extraction unit 104 outputs a label feature with reference information as an input. The reference information may be, for example, label data in general zero-shot training, or an optical image or the like corresponding to an SAR image. The label data is a word. In a case of extracting a label feature from a word, the label feature extraction unit 104 extracts the label feature by word2vec, for example.

Also, in a case where reference information is an optical image, the label feature extraction unit 104 extracts a label feature of the optical image by using a trained convolutional neural network such as VGG or a residual network (ResNet). More specifically, the label feature extraction unit 104 extracts a feature vector of a previous layer of a final layer as a label feature by using a neural network acquired by cutting of a final layer from a trained model.

However, a layer from which a label feature is extracted is not limited to the previous layer of the final layer. The label feature extraction unit 104 may extract a feature vector in any layer as a label feature. Note that as a trained convolutional neural network, what is already trained may be used as it is. Also, fine-tuning may be performed on a trained convolutional neural network by utilization of an optical image corresponding to an SAR image that is a target image. In the fine-tuning, a trained value of a trained model may be used as an initial value, or training using an initial value made of a random number may be performed.

With a label feature as an input, the label feature dimension reduction unit 105 outputs a low-dimensional label feature a dimension of which is reduced (that is, label feature after dimension reduction). The label feature dimension reduction unit 105 performs dimension reduction of the label feature by a principal component analysis, for example. In this case, the matrix generation unit 301 (see FIG. 3) generates a matrix from which a principal component can be extracted with label features of a plurality of reference images as inputs.

The matrix generated by the matrix generation unit 301 and a label feature of a reference image corresponding to a target image are input to the dimension reduction unit 302, and the dimension reduction unit 302 extracts a low-dimensional label feature. More specifically, the dimension reduction unit 302 acquires a low-dimensional label feature by performing a matrix transformation of transforming a label feature into a principal component, and cutting the transformation result at an Mth dimension from a head. Note that in a case of performing a principal component analysis, the dimension reduction unit 302 also performs whitening simultaneously by normalizing variance of each dimension to 1.

A different example of dimension reduction of a label feature will be described. The label feature dimension reduction unit 105 may perform dimension reduction of a label feature by using a sparse random matrix. In a case of using the sparse random matrix, the matrix generation unit 301 generates a random matrix. More specifically, first, the matrix generation unit 301 initializes a random matrix by using a random number. In the initialization, the matrix generation unit 301 randomly generates two values "1" and "−1" with a probability being 50% each. Next, the matrix generation unit 301 sets a value of each element to 0 with a probability of 1−P by using a density parameter P (0<P<1). Also, the number of rows of this matrix is the number of dimensions of a label feature before dimension reduction, and the number of columns of this matrix is the number of dimensions of the label feature after the dimension reduction (low-dimensional label feature).

Different examples of a random number used to initialize a sparse random matrix include a uniform random number equal to or lager than −1 and equal to or smaller than 1, a Gaussian random number with an average being 0 and a standard deviation being 1, and the like.

Next, the dimension reduction unit 302 extracts a low-dimensional label feature on the basis of the random matrix (sparse random matrix) generated by the matrix generation unit 301 and a label feature of reference information corresponding to a target image.

A method used by the dimension reduction unit 302 to perform dimension reduction is not limited to a method of using a principal component analysis or a method of using a sparse random matrix. The dimension reduction unit 302 may perform dimension reduction of a label feature by using singular value decomposition, non-negative matrix factorization, t-distributed stochastic neighbor embedding (t-SNE), or the like. Also, the dimension reduction unit 302 may perform dimension reduction of a label feature by using an autoencoder based on a neural network.

A target image is input to the image feature extraction unit 106, and the image feature extraction unit 106 outputs an image feature extracted from the target image. As a technology of extracting an image feature from an image, the image feature extraction unit 106 uses a convolutional neural network. More specifically, the image feature extraction unit 106 extracts, as an image feature, a feature vector of a previous layer of a final layer by using a network acquired by cutting of the final layer from a trained convolutional neural network.

Note that the trained convolutional neural network used by the image feature extraction unit 106 is preferably a network trained by utilization of an SAR image as training data with an initial value being a random number. Also, the image feature extraction unit 106 may use a network trained from an optical image. Also, the image feature extraction unit 106 may use a network trained from an optical image and fine-tuned with an SAR image.

To the feature transformation unit 107, an image feature extracted by the image feature extraction unit 106 and a parameter input to the data input unit 101 (hereinafter, referred to as transformation parameter) are input. Then, the feature transformation unit 107 performs feature transformation on the image feature in such a manner that comparison with a label feature after the dimension reduction becomes possible. This feature transformation is a linear transformation. In the following, there is a case where performing feature transformation on an image feature in such a manner that comparison with a label feature after dimension reduction becomes possible is referred to as transformation from an image feature to a low-dimensional label feature. Also, in the following, there is a case where an image feature after the feature transformation is referred to as a transformed feature.

A compatible function F(x, y) is defined as the following equation (1).

$$F(x,y;W)=(W\theta(x))^T W_{DR}\varphi(y) \quad (1)$$

Here, θ(x) is an image feature. T means transposition. W is a transformation parameter. $W_{DR}$ is a matrix for dimension reduction. φ(y) is a label feature. A label feature after the dimension reduction is expressed as ($W_{DR}$φ(y)). Also, as a transformation parameter input to the feature transformation unit 107, a parameter trained by utilization of an image different from a target image is used.

Also, the feature transformation unit 107 may perform dimension reduction on the image feature θ(x) before feature transformation. In other words, the feature transformation unit 107 may perform, after performing dimension reduction on the image feature θ(x), feature transformation on the image feature after the dimension reduction. In this case, when it is assumed that a vector acquired by the dimension reduction of θ(x) is Vθ(x), a compatible function can be also expressed as the following equation (2).

$$F(x,y;W)=(W(V\theta(x)))^T W_{DR}\varphi(y) \quad (2)$$

Here, a matrix V to perform the dimension reduction of the image feature θ(x) can be acquired by a principal component analysis as in the case of $W_{DR}$. Also, a sparse random matrix may be used as the matrix V to perform the dimension reduction of the image feature θ(x) as in the case of $W_{DR}$.

With the label feature a dimension of which is reduced by the label feature dimension reduction unit 105 (low-dimensional label feature) and the image feature transformed by the feature transformation unit 107 (transformed feature) being inputs, the class recognition unit 108 recognizes a class of the target image. In other words, the class recognition unit 108 recognizes a class of an object that is captured in the target image and that is to be recognized. The the class recognition unit 108 outputs, as a recognition result, likelihood that the object to be recognized corresponds to each class, or a class determined as a class of the object to be recognized. For example, the feature transformation unit 107 calculates cosine similarity between the low-dimensional label feature and the transformed feature and outputs, as a recognition result, a class having the highest similarity. More specifically, a label $y_{pred}$ that maximizes F(x, y; W) is selected as in the following equation (3). In this case, the selected label $y_{pred}$ is a recognition result of a class of the object to be recognized.

[Math 1]

$$y_{pred} = \underset{y_i}{\operatorname{argmax}}(F(x, y; W)) \quad (3)$$

The estimation result output unit 103 (see FIG. 1) outputs the recognition result acquired by the class recognition unit 108 of the class estimation unit 102 to the outside. It is assumed that a recognition result for an object to be recognized, which object is different from an object that is to be recognized and that is trained in advance for recognition in the class estimation unit 102, is acquired as the recognition result here.

An example of a mode in which the estimation result output unit 103 outputs a recognition result is, for example, a mode of transmitting a recognition result to an external device. However, a mode of outputting the recognition result is not limited to this example. In the following description, a case where the estimation result output unit 103 transmits a recognition result to an external device will be described as an example.

The estimation result output unit 103 is realized, for example, by a central processing unit (CPU) of a computer that operates according to an image recognition program, and a communication interface of the computer. For example, the CPU may read an image recognition program from a program recording medium such as a program storage device of the computer, and operate as the estimation result output unit 103 according to the image recognition program by using the communication interface. Also, the class estimation unit 102 including the label feature extraction unit 104, the label feature dimension reduction unit 105, the image feature extraction unit 106, the feature transformation unit 107, and the class recognition unit 108 is realized, for example, by the CPU of the above-described computer that operates according to the image recognition program. In this case, as described above, the CPU that reads the image recognition program operates as the class estimation unit 102 including the label feature extraction unit 104, the label feature dimension reduction unit 105, the image feature extraction unit 106, the feature transformation unit 107, and the class recognition unit 108.

Also, the image recognition system may have a configuration in which two or more physically-separated devices are connected in a wired or wireless manner.

Figure 4:
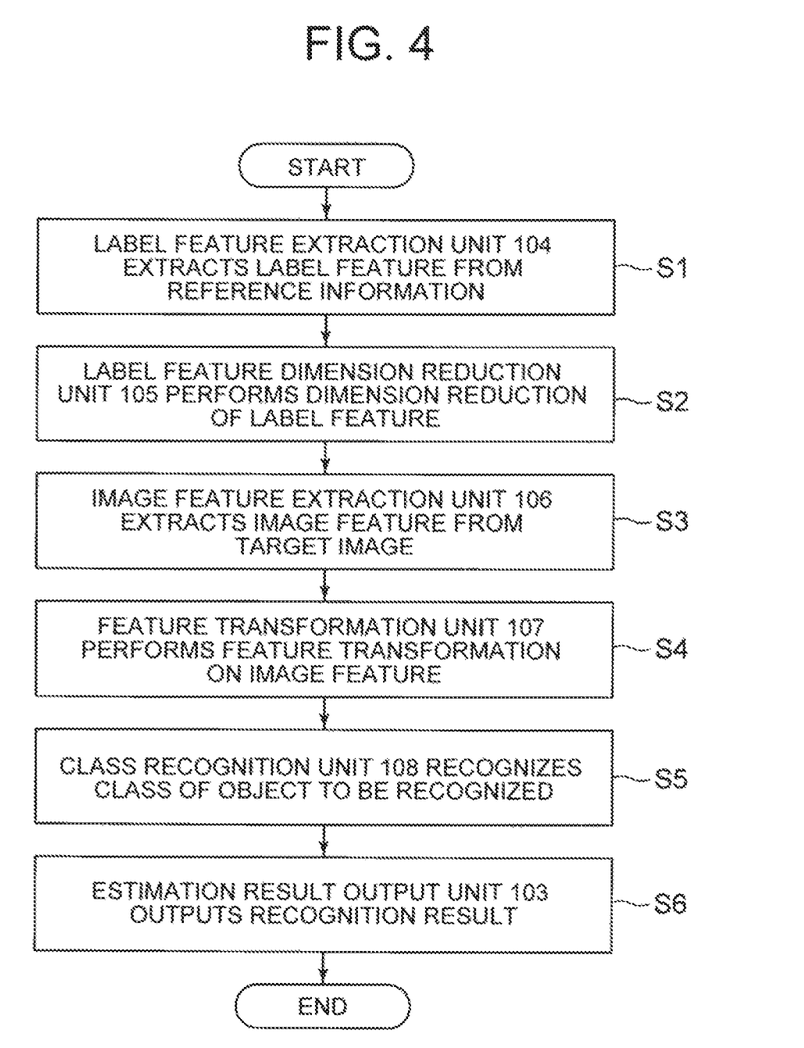
FIG. 4 It depicts a flowchart illustrating an example of processing progress of an image recognition system of a first exemplary embodiment of the present invention.

FIG. 4 is a flowchart illustrating an example of processing progress of an image recognition system of a first exemplary embodiment of the present invention. Note that a detailed description of an already-described item is omitted. Also, it is assumed that a target image, a transformation parameter, and reference information are already input to a class estimation unit 102 via a data input unit 101.

First, a label feature extraction unit 104 extracts a label feature from the reference information (Step S1).

Next, a label feature dimension reduction unit 105 performs dimension reduction of the label feature (Step S2).

Then, an image feature extraction unit 106 extracts an image feature from the target image (Step S3).

Next, the feature transformation unit 107 performs feature transformation on the image feature (Step S4).

Next, a class recognition unit 108 recognizes a class of an object to be recognized on the basis of the label feature after the dimension reduction and the image feature after the feature transformation (Step S5).

Then, the estimation result output unit 103 outputs a recognition result acquired in Step S5 (Step S6).

In the present exemplary embodiment, a component that is likely to contribute to recognition due to large movement in the label feature is extracted as a principal component. Thus, it is possible to cut a noise component unnecessary for recognition and to improve estimation accuracy of zero-shot recognition.

Alternatively, a component that is likely to contribute to recognition due to large movement in the label feature is extracted by a sparse random matrix. Thus, it is possible to cut a noise component unnecessary for recognition and to improve estimation accuracy of zero-shot recognition.

Thus, an object to be recognized can be recognized accurately in the present exemplary embodiment.

Second Exemplary Embodiment

In a second exemplary embodiment of the present invention, a parameter-training system that trains a parameter used in image recognition processing will be described. This parameter is a parameter of a function for transforming an image feature of a target image into a label feature of reference information (label feature after dimension reduction). In other words, the above parameter is a parameter of a function for performing feature transformation on an image feature in such a manner that comparison with a label feature after dimension reduction becomes possible. In the present exemplary embodiment, this parameter is referred to as a transformation parameter, or may be also referred to as a model parameter. Also, in the following description, this function is referred to as a transformation function.

Figure 5:
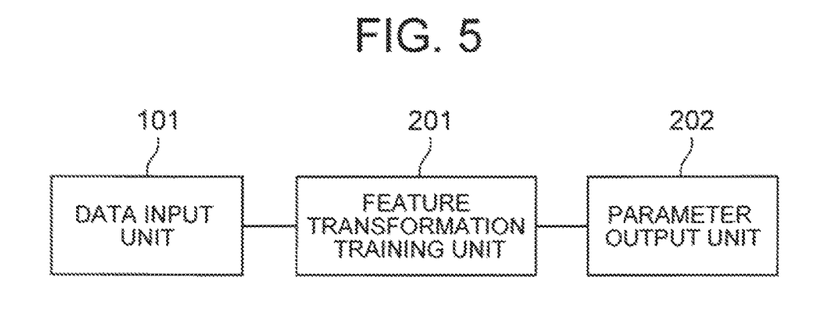
FIG. 5 It depicts a block diagram illustrating a configuration example of a parameter-training system of the present invention.

FIG. 5 is a block diagram illustrating a configuration example of a parameter-training system of the present invention. The same reference sign as FIG. 1 is given to an element similar to an element of the first exemplary embodiment, and a detailed description thereof is omitted. The parameter-training system of the present invention includes a data input unit 101, a feature transformation training unit 201, and a parameter output unit 202.

In the present exemplary embodiment, image data and reference information are input to the data input unit 101.

With the image data and the reference information acquired by the data input unit 101 being inputs, the feature transformation training unit 201 outputs a transformation parameter for the input image data (parameter of transformation function for transforming image feature of target image into label feature of reference information (label feature after dimension reduction)).

The parameter output unit 202 outputs the transformation parameter to the outside of the parameter-training system. For example, the parameter output unit 202 may transmit the transformation parameter to an external image recognition system.

Figure 6:
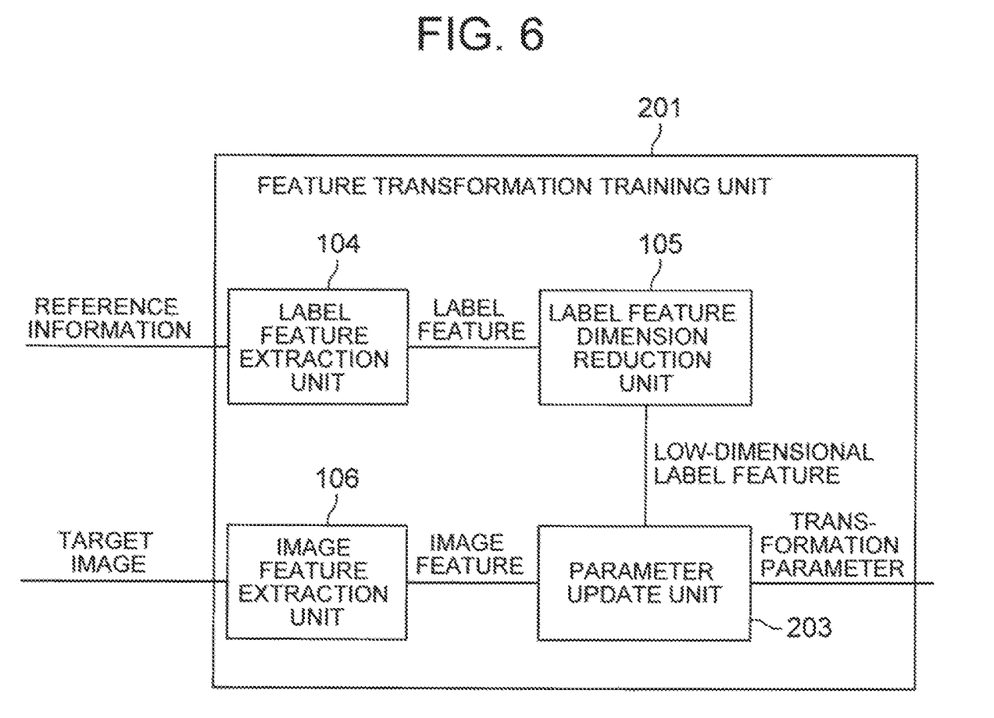
FIG. 6 It depicts a block diagram illustrating a configuration example of a feature transformation training unit.

FIG. 6 is a block diagram illustrating a configuration example of the feature transformation training unit 201. The same reference sign as FIG. 2 is given to an element similar to an element included in the class estimation unit 102 of the first exemplary embodiment (see FIG. 2), and a detailed description thereof is omitted. The feature transformation training unit 201 includes a label feature extraction unit 104, a label feature dimension reduction unit 105, an image feature extraction unit 106, and a parameter update unit 203. The label feature extraction unit 104, the label feature dimension reduction unit 105, and the image feature extraction unit 106 are similar to the label feature extraction unit 104, the label feature dimension reduction unit 105, and the image feature extraction unit 106 in the first exemplary embodiment, and a description thereof is omitted.

With an image feature output from the image feature extraction unit 106, a low-dimensional label feature output from the label feature dimension reduction unit 105 (label feature after dimension reduction), and a label of a label feature (reference information that is base from which label feature is extracted) being inputs, the parameter update unit 203 optimizes a model parameter of a transformation function. The parameter update unit 203 may use simple linear regression as a model, for example. Alternatively, for example, the parameter update unit 203 may use a multilayer neural network as a model or may use a model such as a support vector machine. The model parameter corresponds to the above-described transformation parameter.

The parameter update unit 203 repeats processing of optimizing a model parameter and updating a value of the model parameter.

For example, there is negative cosine similarity or the like as an error function for parameter optimization. In a case where negative cosine similarity is used as an error function for parameter optimization, the error function can be expressed as the following equation (4).

$$E(X,Y;W)=-F(x,y;W)_{norm} \quad (4)$$

In the equation (4), $F(x, y; W)_{norm}$ is acquired by division of a compatible function $F(x, y; W)$, which is acquired by the above-described equation (1), by $|W\theta(x)|$ and $|W_{DR}\varphi(y)|$ and represents cosine similarity. Note that the error function may include a regularization term.

Note that the parameter update unit 203 may perform dimension reduction on an image feature $\theta(x)$ before the parameter optimization. In this case, the compatible function can be also expressed as the equation (2) described in the first exemplary embodiment. As described in the first exemplary embodiment, in the equation (2), $V\theta(x)$ is a vector acquired by dimension reduction of $\theta(x)$.

A different example of an error function is a square error. In a case where a square error and a regularization term for a model parameter $W$ are used as examples of the error function, the error function can be expressed as the following equation (5).

$$E(X,Y;W)=|W_{DR}\varphi(y)-W\theta(x)|^2+\alpha|W|^2 \quad (5)$$

Here, $W_{DR}$ is a matrix for dimension reduction. $\varphi(y)$ is a label feature. Also, $\theta(x)$ is an image feature. $W$ is a model parameter. $\alpha$ is a hyperparameter for regularization. A label feature after the dimension reduction is expressed as ($W_{DR}\varphi(y)$).

The parameter update unit 203 ends a parameter update (in other words, parameter optimization) in a case where a determination criterion that "a value of a parameter is updated for a predetermined number of times" is satisfied. That is, the parameter update unit 203 ends the processing when updating a value of a parameter for a predetermined number of times. At that time point, a value of the model parameter (transformation parameter) is determined.

The predetermined number of times may be determined in advance. Alternatively, for example, a user of the parameter-training system may input information of a predetermined number of times to the data input unit 101, and the parameter update unit 203 may receive an input of the information of a predetermined number of times from the user via the data input unit 101.

The parameter output unit 202 is realized, for example, by a CPU of a computer that operates according to a parameter-training program, and a communication interface of the computer. For example, the CPU may read a parameter-training program from a program recording medium such as a program storage device of the computer, and operate as the parameter output unit 202 according to the parameter-training program by using the communication interface. Also, the feature transformation training unit 201 including the label feature extraction unit 104, the label feature dimension reduction unit 105, the image feature extraction unit 106, and the parameter update unit 203 is realized, for example, by the CPU of the above-described computer that operates according to the parameter-training program. In this case, as described above, the CPU that reads the parameter-training program operates as the feature transformation training unit 201 including the label feature extraction unit 104, the label feature dimension reduction unit 105, the image feature extraction unit 106, and the parameter update unit 203.

Also, the parameter-training system may have a configuration in which two or more physically-separated devices are connected in a wired or wireless manner.

Figure 7:
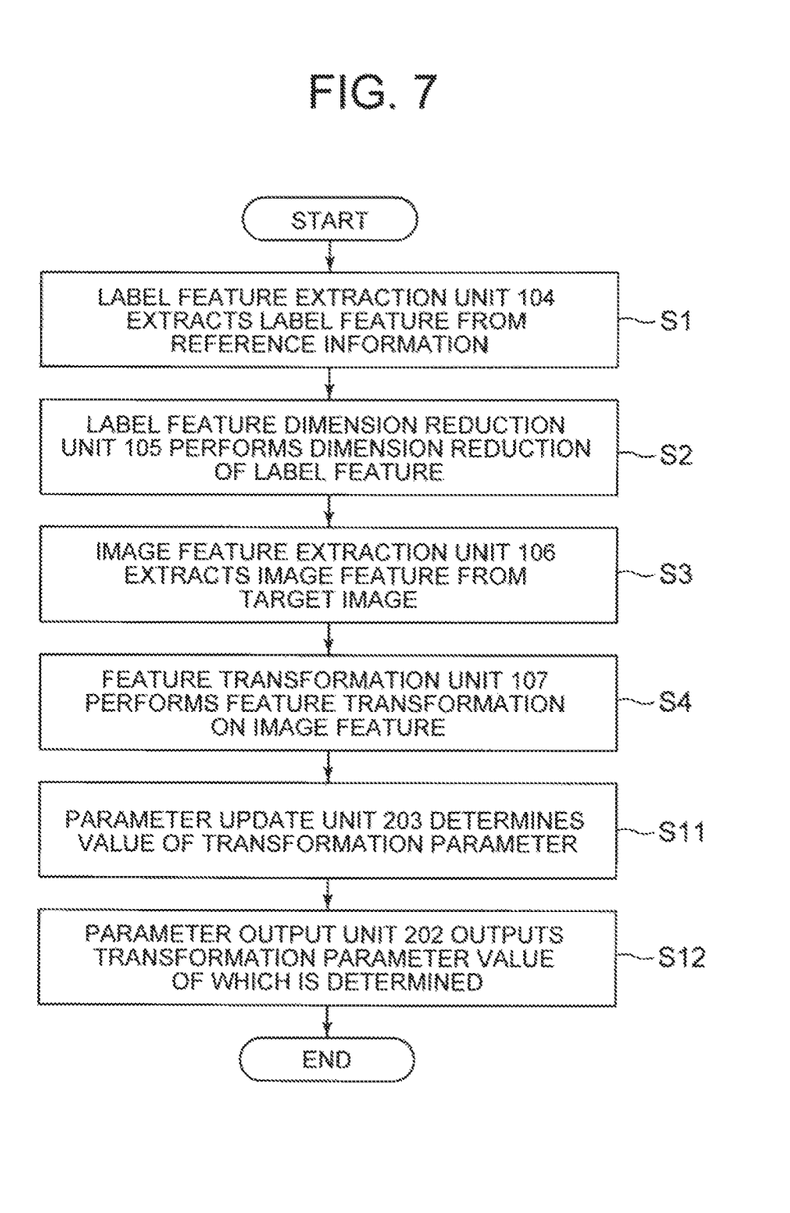
FIG. 7 It depicts a flowchart illustrating an example of processing progress of a parameter-training system of a second exemplary embodiment of the present invention.

FIG. 7 is a flowchart illustrating an example of processing progress of the parameter-training system of the second exemplary embodiment of the present invention. Note that a detailed description of an already-described item is omitted.

Operations in Step S1 to S4 are similar to those in Step S1 to S4 in the first exemplary embodiment, and a description thereof is omitted.

After Step S4, the parameter update unit 203 repeats processing of optimizing a transformation parameter by using an error function and of updating a value of the transformation parameter, and determines the value of the transformation parameter (Step S11).

Next, the parameter output unit 202 outputs, to the outside, the transformation parameter the value of which is determined (Step S12).

Also in the present exemplary embodiment, a component that is likely to contribute to recognition due to large movement in a label feature is extracted as a principal component. Thus, a noise component unnecessary for recognition can be cut. As a result, it is possible to train a model parameter (transformation parameter) in such a manner as to improve estimation accuracy of zero-shot recognition.

Also, in the present exemplary embodiment, the number of dimensions of each of a label feature and an image feature can be reduced. Thus, over-fitting does not occur in a case where an amount of data is small. Thus, it is possible to improve recognition accuracy of a case where recognition is performed by utilization of a trained transformation parameter.

Thus, in the present exemplary embodiment, a parameter used in processing of recognizing an object to be recognized can be trained in such a manner that the object to be recognized can be recognized accurately.

Figure 8:
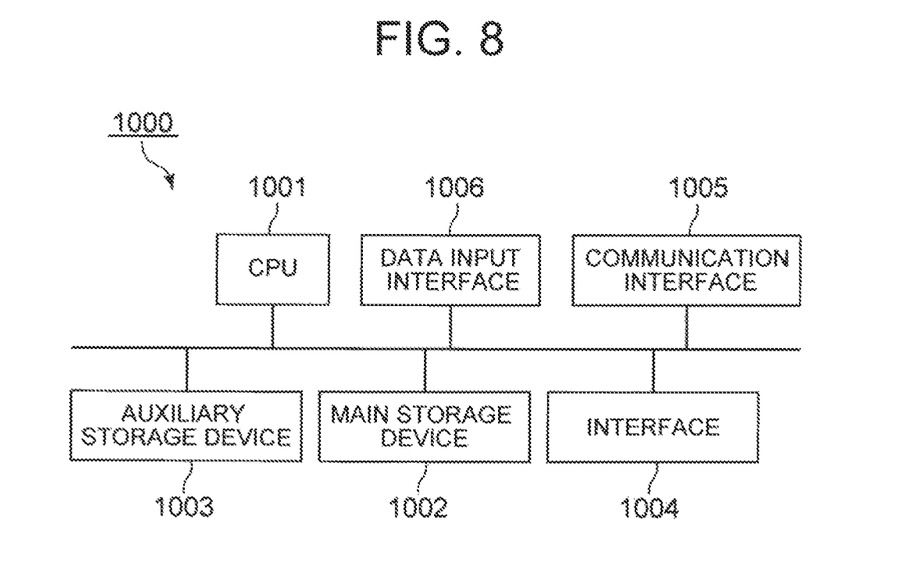
FIG. 8 It depicts a schematic block diagram illustrating a configuration example of a computer according to each exemplary embodiment of the present invention.

FIG. 8 is a schematic block diagram illustrating a configuration example of a computer according to each exemplary embodiment of the present invention. A computer 1000 includes a CPU 1001, a main storage device 1002, an auxiliary storage device 1003, an interface 1004, a data input interface 1006, and a communication interface 1005.

An image recognition system of the present invention is mounted in the computer 1000. An operation of the image recognition system is stored in a form of an image recognition program in the auxiliary storage device 1003. The CPU 1001 reads the image recognition program from the auxiliary storage device 1003, expands the program in the main storage device 1002, and executes the above-described processing according to the image recognition program.

Also, a parameter-training system of the present invention is mounted in a computer similar to the computer 1000. An operation of the parameter-training system is stored in a form of a parameter-training program in the auxiliary storage device 1003. The CPU 1001 reads the parameter-training program from the auxiliary storage device 1003, expands the program in the main storage device 1002, and executes the above-described processing according to the parameter-training program.

The auxiliary storage device 1003 is an example of a non-transitory tangible medium. Different examples of a non-transitory tangible medium include a magnetic disk, a magneto-optical disk, a compact disk read only memory (CD-ROM), a digital versatile disk read only memory (DVD-ROM), a semiconductor memory, and the like connected via the interface 1004. Also, in a case where a program (image recognition program or parameter-training program) is distributed to the computer 1000 via a communication line, the computer 1000 that receives the distribution may expand the program in the main storage device 1002, and execute processing of an image recognition system or processing of a parameter-training system.

Also, a part or whole of each component of the image recognition system may be realized by general-purpose or dedicated circuitry, processor, or the like or a combination thereof. These may include a single chip or may include a plurality of chips connected via a bus. Also, a part or whole of each component may be realized by a combination of the above-described circuitry or the like with the program. This point is similar with respect to the parameter-training system.

Also, in a case where a part or whole of each component of the image recognition system is realized by a plurality of information processing devices, circuitry, and the like, the plurality of information processing devices, circuitry, and the like may be collectively arranged or dispersedly arranged. For example, the information processing devices, circuitry, and the like may be realized as a client and server system, a cloud computing system, or the like in a form of being connected to each other via a communication network. This point is similar with respect to the parameter-training system.

Figure 9:
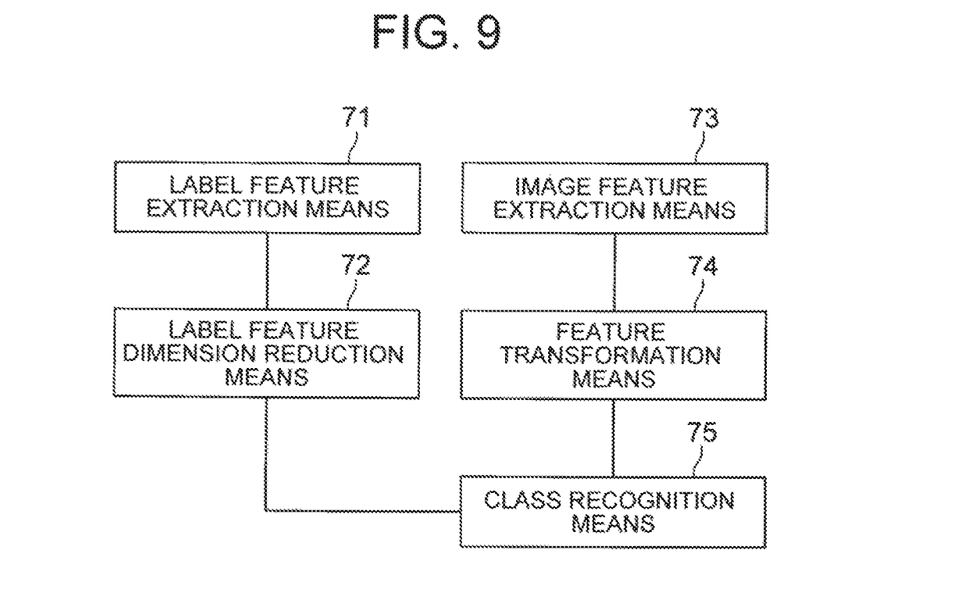
FIG. 9 It depicts a block diagram illustrating an outline of an image recognition system of the present invention.

Next, an outline of the present invention will be described. FIG. 9 is a block diagram illustrating an outline of an image recognition system of the present invention. The image recognition system of the present invention includes a label feature extraction means 71, a label feature dimension reduction means 72, an image feature extraction means 73, a feature transformation means 74, and a class recognition means 75.

The label feature extraction means 71 (such as label feature extraction unit 104) extracts, from reference information, a label feature that is a vector representing a feature of the reference information.

The label feature dimension reduction means 72 (such as label feature dimension reduction unit 105) performs dimension reduction of the label feature.

The image feature extraction means 73 (such as image feature extraction unit 106) extracts an image feature from a target image that is an image in which an object to be recognized is captured.

The feature transformation means 74 (such as feature transformation unit 107) performs feature transformation on the image feature in such a manner that comparison with the label feature after the dimension reduction becomes possible.

The class recognition means 75 (such as class recognition unit 108) recognizes a class of an object to be recognized by comparing the image feature after the feature transformation with the label feature after the dimension reduction.

With such a configuration, a different object can be recognized accurately.

Figure 10:
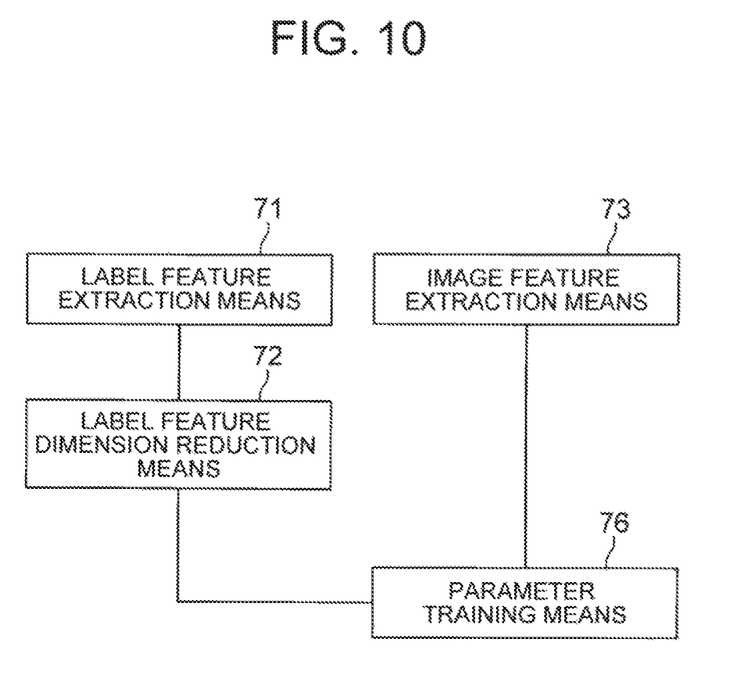
FIG. 10 It depicts a block diagram illustrating an outline of a parameter-training system of the present invention.

FIG. 10 is a block diagram illustrating an outline of a parameter-training system of the present invention. The parameter-training system of the present invention includes a label feature extraction means 71, a label feature dimension reduction means 72, an image feature extraction means 73, and a parameter-training means 76.

The label feature extraction means 71, the label feature dimension reduction means 72, and the image feature extraction means 73 are similar to the label feature extraction means 71, the label feature dimension reduction means 72, and the image feature extraction means 73 illustrated in FIG. 9.

On the basis of a label features after dimension reduction and an image feature extracted by the image feature extraction means 73, the parameter-training means 76 (such as parameter update unit 203) trains a parameter used for transformation of the image feature.

With such a configuration, a parameter used in processing of recognizing an object to be recognized can be trained in such a manner that the object to be recognized can be recognized accurately.

The above-described exemplary embodiments of the present invention may be described in a manner of the following supplementary notes, but are not limited to the following.

(Supplementary Note 1)

An image recognition system including:

a label feature extraction means that extracts, from reference information, a label feature that is a vector representing a feature of the reference information;

a label feature dimension reduction means that performs dimension reduction of the label feature;

an image feature extraction means that extracts an image feature from a target image that is an image in which an object to be recognized is captured;

a feature transformation means that performs feature transformation on the image feature in such a manner that comparison with the label feature after the dimension reduction becomes possible; and a class recognition means that recognizes a class of the object to be recognized by comparing the image feature after the feature transformation with the label feature after the dimension reduction.

(Supplementary Note 2)

The image recognition system according to supplementary note 1, wherein the label feature dimension reduction means performs the dimension reduction of the label feature by a principal component analysis.

(Supplementary Note 3)

The image recognition system according to supplementary note 1, wherein the label feature dimension reduction means performs the dimension reduction of the label feature by using a sparse random matrix.

(Supplementary Note 4)

The image recognition system according to any one of supplementary notes 1 to 3, wherein the feature transformation means performs feature transformation after performing dimension reduction of the image feature.

(Supplementary Note 5)

A parameter-training system including:

a label feature extraction means that extracts, from reference information, a label feature that is a vector representing a feature of the reference information;

a label feature dimension reduction means that performs dimension reduction of the label feature;

an image feature extraction means that extracts an image feature from a target image that is an image in which an object to be recognized is captured; and a parameter-training means that trains a parameter, which is used for transformation of the image feature, on the basis of the label feature after the dimension reduction and the image feature.

(Supplementary Note 6)

The parameter-training system according to supplementary note 5, wherein the label feature dimension reduction means performs the dimension reduction of the label feature by a principal component analysis.

(Supplementary Note 7)

The parameter-training system according to supplementary note 5, wherein the label feature dimension reduction means performs the dimension reduction of the label feature by using a sparse random matrix.

(Supplementary Note 8)

The parameter-training system according to any one of supplementary notes 5 to 7, wherein the parameter-training means repeats optimization of the parameter, and optimizes the parameter after performing dimension reduction of the image feature in the optimization of the parameter.

(Supplementary Note 9)

An image recognition method including:

extracting, from reference information, a label feature that is a vector representing a feature of the reference information;

performing dimension reduction of the label feature;

extracting an image feature from a target image that is an image in which an object to be recognized is captured;

performing feature transformation on the image feature in such a manner that comparison with the label feature after the dimension reduction becomes possible; and recognizing a class of the object to be recognized by comparing the image feature after the feature transformation with the label feature after the dimension reduction.

(Supplementary Note 10)

A parameter-training method including:

extracting, from reference information, a label feature that is a vector representing a feature of the reference information;

performing dimension reduction of the label feature;

extracting an image feature from a target image that is an image in which an object to be recognized is captured; and training a parameter, which is used for transformation of the image feature, on the basis of the label feature after the dimension reduction and the image feature.

(Supplementary Note 11)

An image recognition program causing a computer to execute label feature extraction processing of extracting, from reference information, a label feature that is a vector representing a feature of the reference information, label feature dimension reduction processing of performing dimension reduction of the label feature, image feature extraction processing of extracting an image feature from a target image that is an image in which an object to be recognized is captured, feature transformation processing of performing feature transformation on the image feature in such a manner that comparison with the label feature after the dimension reduction becomes possible, and class recognition processing of recognizing a class of the object to be recognized by comparing the image feature after the feature transformation with the label feature after the dimension reduction.

(Supplementary Note 12)

A parameter-training program causing a computer to execute label feature extraction processing of extracting, from reference information, a label feature that is a vector representing a feature of the reference information, label feature dimension reduction processing of performing dimension reduction of the label feature, image feature extraction processing of extracting an image feature from a target image that is an image in which an object to be recognized is captured, and parameter-training processing of training a parameter, which is used for transformation of the image feature, on the basis of the label feature after the dimension reduction and the image feature.

Although the present invention has been described with reference to exemplary embodiments, the present invention is not limited to the above-described exemplary embodiments. Various modifications that can be understood by those skilled in the art can be made within the scope of the present invention with respect to a configuration or a detail of the present invention.

INDUSTRIAL APPLICABILITY

The present invention is suitably applicable to an image recognition system that recognizes an image, and a parameter-training system that trains a parameter used in such an image recognition system.

REFERENCE SIGNS LIST

101 Data input unit
102 Class estimation unit
103 Estimation result output unit
104 Label feature extraction unit
105 Label feature dimension reduction unit
106 Image feature extraction unit
107 Feature transformation unit
108 Class recognition unit
201 Feature transformation training unit
202 Parameter output unit
203 Parameter update unit
301 Matrix generation unit
302 Dimension reduction unit

The invention claimed is:

1. An image recognition system comprising:
at least one memory configured to store instructions; and
at least one processor configured to execute the instructions to:
extract, from reference information, a label feature that is a vector representing a feature of the reference information;
perform dimension reduction of the label feature;
extract an image feature from a target image that is an image in which an object to be recognized is captured;
perform feature transformation on the image feature in such a manner that comparison with the label feature after the dimension reduction becomes possible; and
recognize a class of the object to be recognized by comparing the image feature after the feature transformation with the label feature after the dimension reduction,
wherein the at least one processor
performs the feature transformation after performing the dimension reduction of the image feature.

2. The image recognition system according to claim 1, wherein
the at least one processor performs
the dimension reduction of the label feature by a principal component analysis.

3. The image recognition system according to claim 1, wherein
the at least one processor performs
the dimension reduction of the label feature by using a sparse random matrix.

4. A parameter-training system comprising:
at least one memory configured to store instructions; and
at least one processor configured to execute the instructions to:
extract, from reference information, a label feature that is a vector representing a feature of the reference information;
perform dimension reduction of the label feature;
extract an image feature from a target image that is an image in which an object to be recognized is captured; and
train a parameter, which is used for transformation of the image feature, based on the label feature after the dimension reduction and the image feature,
wherein the at least one processor
repeats optimization of the parameter, and
optimizes the parameter after performing the dimension reduction of the image feature in the optimization of the parameter.

5. The parameter-training system according to claim 4, wherein
the at least one processor performs
the dimension reduction of the label feature by a principal component analysis.

6. The parameter-training system according to claim 4, wherein
the at least one processor performs
the dimension reduction of the label feature by using a sparse random matrix.

7. An image recognition method comprising:
extracting, from reference information, a label feature that is a vector representing a feature of the reference information;
performing dimension reduction of the label feature;
extracting an image feature from a target image that is an image in which an object to be recognized is captured;
performing feature transformation on the image feature in such a manner that comparison with the label feature after the dimension reduction becomes possible; and
recognizing a class of the object to be recognized by comparing the image feature after the feature transformation with the label feature after the dimension reduction,
wherein the feature transformation is performed after performing the dimension reduction of the image feature.

* * * * *